(12) United States Patent
Alelyunas

(10) Patent No.: US 10,461,963 B2
(45) Date of Patent: Oct. 29, 2019

(54) TWO-DIMENSIONAL FILTERING OF PILOTS AND CARRIERS FOR OFDM CHANNEL ESTIMATION

(71) Applicant: Silicon Laboratories Inc., Austin, TX (US)

(72) Inventor: Carl H. Alelyunas, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 146 days.

(21) Appl. No.: 15/611,431

(22) Filed: Jun. 1, 2017

(65) Prior Publication Data

US 2018/0351768 A1 Dec. 6, 2018

(51) Int. Cl.
*H04L 25/02* (2006.01)
*H04L 5/00* (2006.01)
*H04L 27/26* (2006.01)

(52) U.S. Cl.
CPC .......... *H04L 25/025* (2013.01); *H04L 5/0048* (2013.01); *H04L 27/261* (2013.01); *H04L 5/0007* (2013.01); *H04L 27/2647* (2013.01)

(58) Field of Classification Search
CPC .. H04L 25/025; H04L 5/0048; H04L 27/2649
See application file for complete search history.

(56) References Cited

U.S. PATENT DOCUMENTS

| | | | |
|---|---|---|---|
| 7,702,307 B2 | 4/2010 | Taipale et al. | |
| 8,223,903 B2 | 7/2012 | Ghazi-Moghadam et al. | |
| 8,265,133 B2 | 9/2012 | Elenes | |
| 8,774,328 B2 | 7/2014 | Elenes et al. | |
| 8,780,838 B2 | 7/2014 | Mittelsteadt et al. | |
| 8,942,303 B1* | 1/2015 | Veyseh | H04L 25/0232 375/260 |
| 8,949,302 B2 | 2/2015 | Elenes | |
| 9,001,945 B2 | 4/2015 | Elenes et al. | |
| 9,124,334 B2 | 9/2015 | Elenes et al. | |
| 9,312,972 B2 | 4/2016 | Elenes | |
| 2006/0018393 A1* | 1/2006 | Gore | H04L 5/0048 375/260 |
| 2006/0198449 A1* | 9/2006 | De Bart | H04L 25/0236 375/260 |
| 2011/0012787 A1* | 1/2011 | Na | H01Q 3/2605 342/373 |

OTHER PUBLICATIONS

Silicon Laboratories, "High-Performance Automotive AM/FM Radio Receiver and HD Radio™/DAB/DAB+/DMB/DRM Tuner," Si4790x, Aug. 25, 2014, 3 pages.

* cited by examiner

*Primary Examiner* — David S Huang
(74) *Attorney, Agent, or Firm* — Zagorin Cave LLP (57) ABSTRACT

A method includes generating a two-dimensionally filtered pilot tone based on a plurality of received pilot tones received using a first subcarrier of each of a plurality of received OFDM symbols and a plurality of data symbols received using a second subcarrier of each of the plurality of received OFDM symbols. The plurality of OFDM symbols is received sequentially over a plurality of OFDM symbol times. The method may include generating inverse channel coefficients based on the two-dimensionally filtered pilot tone. The method may include applying the inverse channel coefficients to a subsequently received OFDM symbol to recover data encoded in the subsequently received OFDM symbol. Generating the two-dimensionally filtered pilot tone may use at least one least-mean-squares filter.

20 Claims, 8 Drawing Sheets

TWO-DIMENSIONAL FILTERING OF PILOTS AND CARRIERS FOR OFDM CHANNEL ESTIMATION

BACKGROUND

Field of the Invention

The invention is related to communications systems and more particularly to receivers of orthogonal frequency division multiplexing (OFDM) communications systems.

Description of the Related Art

Figure 1:
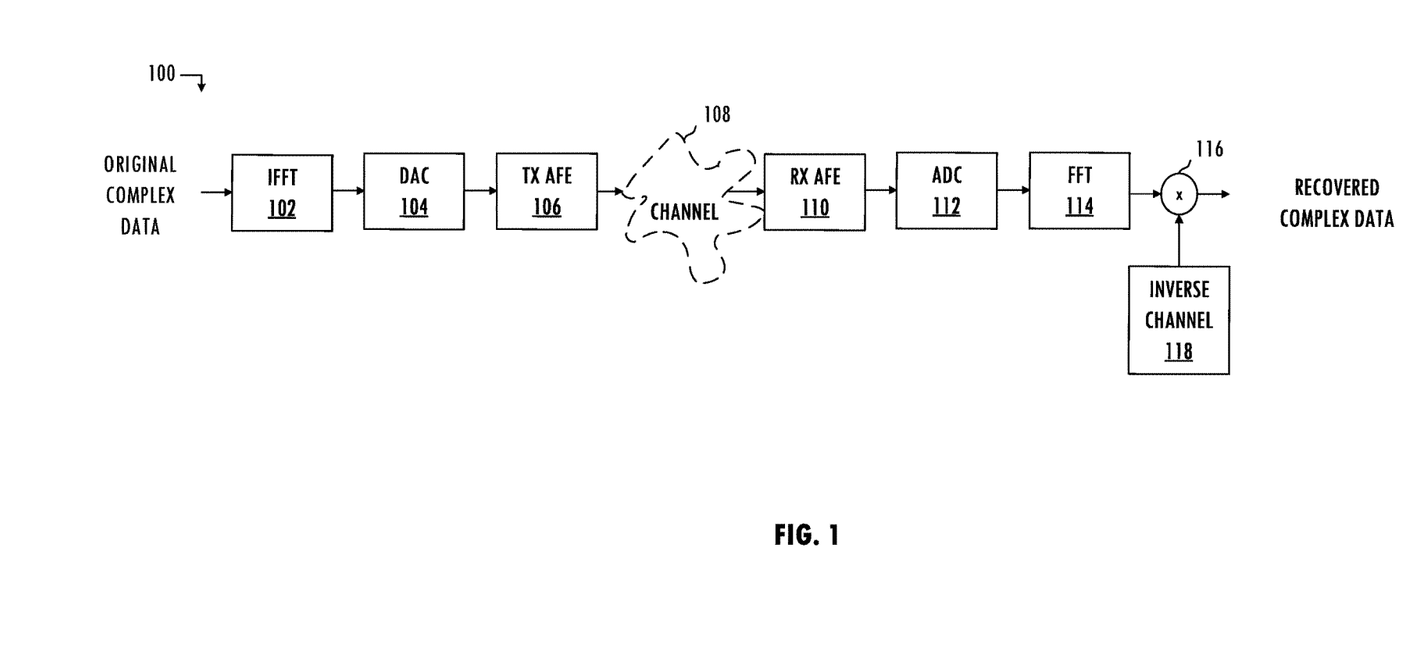
FIG. 1 illustrates a functional block diagram of a conventional OFDM communications system.

In general, an OFDM communications system includes a transmitter that generates a signal for transmission by modulating complex data values using an inverse Fourier transform to generate a time-domain signal. The transmitter transmits the signal over a transmission medium (i.e., a channel) to a receiver. Referring to FIG. 1, in an exemplary conventional OFDM system, inverse fast Fourier transform (IFFT) 102 modulates original complex data and provides time domain, digital data to digital-to-analog converter 104 for conversion into analog data for transmission as electromagnetic signals using channel 108. Receiver analog front end 110 provides analog data to analog-to-digital converter 112, which provides digital, time domain data to fast Fourier transform (FFT) 114. Fast Fourier transform 114 demodulates the digital, time domain data by performing a discrete Fourier transform that converts the digital time domain data from a time domain representation to a frequency domain representation, referred to herein as a received OFDM symbol. Complex multiplier 116 multiplies the received OFDM symbol by digital inverse channel coefficients provided by inverse channel coefficients 118 to provide recovered complex data. Generation of inverse channel coefficients 118 based on an estimate of channel 108 is the subject of substantial effort during the design of an OFDM receiver.

During steady-state communications, a typical OFDM receiver performs frequency domain equalization, which includes receiving one or more pilot tones (i.e., known complex data corresponding to known values of amplitude and phase at regular frequency intervals) using dedicated subcarriers of an OFDM symbol for transmission. The receiver uses the received pilot tones to generate or update a transfer function of the channel response (i.e., an equalizer gain and phase shift for each subcarrier of the OFDM signal). Since a complex multiply in the frequency domain is equivalent to a convolution in the time domain, the receiver uses a complex multiplication of the received OFDM symbol in the frequency domain with frequency domain filter coefficients (i.e., complex coefficients) for the inverse channel filter to recover the original complex data from the received signal. For a channel with frequency response C(f), the inverse channel filter I(f) is constructed by $C^*(f)/\|C(f)\|^2$, where $C^*(f)$ is the complex conjugate of C(f) and $\|C(f)\|$ is the magnitude of C(f). Thus, the combination of the channel and the inverse channel filter gives a flat frequency response and linear phase $C(f) \times I(f) = 1$.

Figure 2:
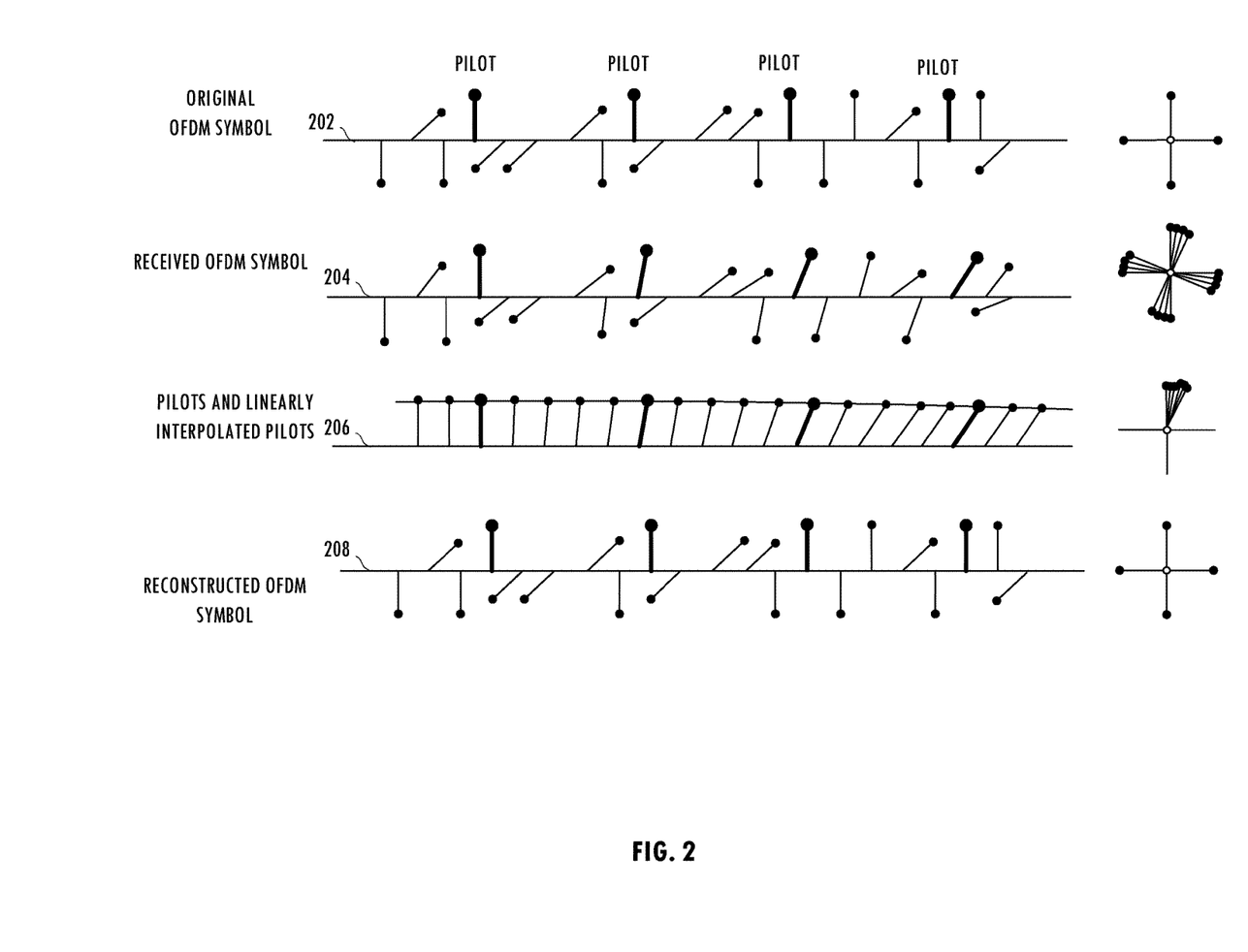
FIG. 2 illustrates a frequency domain representation of an exemplary channel estimation technique using interpolation between recovered pilot tones.

FIG. 2 illustrates an exemplary OFDM symbol that includes 21 subcarriers, which communicate four pilot tones and 17 data symbols. Original OFDM symbol 202 illustrates original data for transmission and received OFDM symbol 204 illustrates the received data after modulation for transmission (e.g., IFFT), transmission over the channel, and demodulation (i.e., FFT) at the receiver. A conventional technique for generating the inverse channel transfer function assumes that the pilot tones are received correctly. The conventional technique uses the received pilot tones and linearly interpolated values between the received pilot tones, as illustrated by OFDM symbol 206 to generate the inverse channel filter coefficients. The receiver uses those inverse channel filter coefficients to reconstruct the original OFDM symbol, as illustrated by reconstructed OFDM symbol 208. This technique assumes a simple delay channel. However, in a noisy system, the received pilot tones have an associated error that is substantial enough to degrade the channel estimate. A poorly estimated channel will cause additional errors when using the inverse of that channel estimate to reconstruct the original data.

Figure 3:
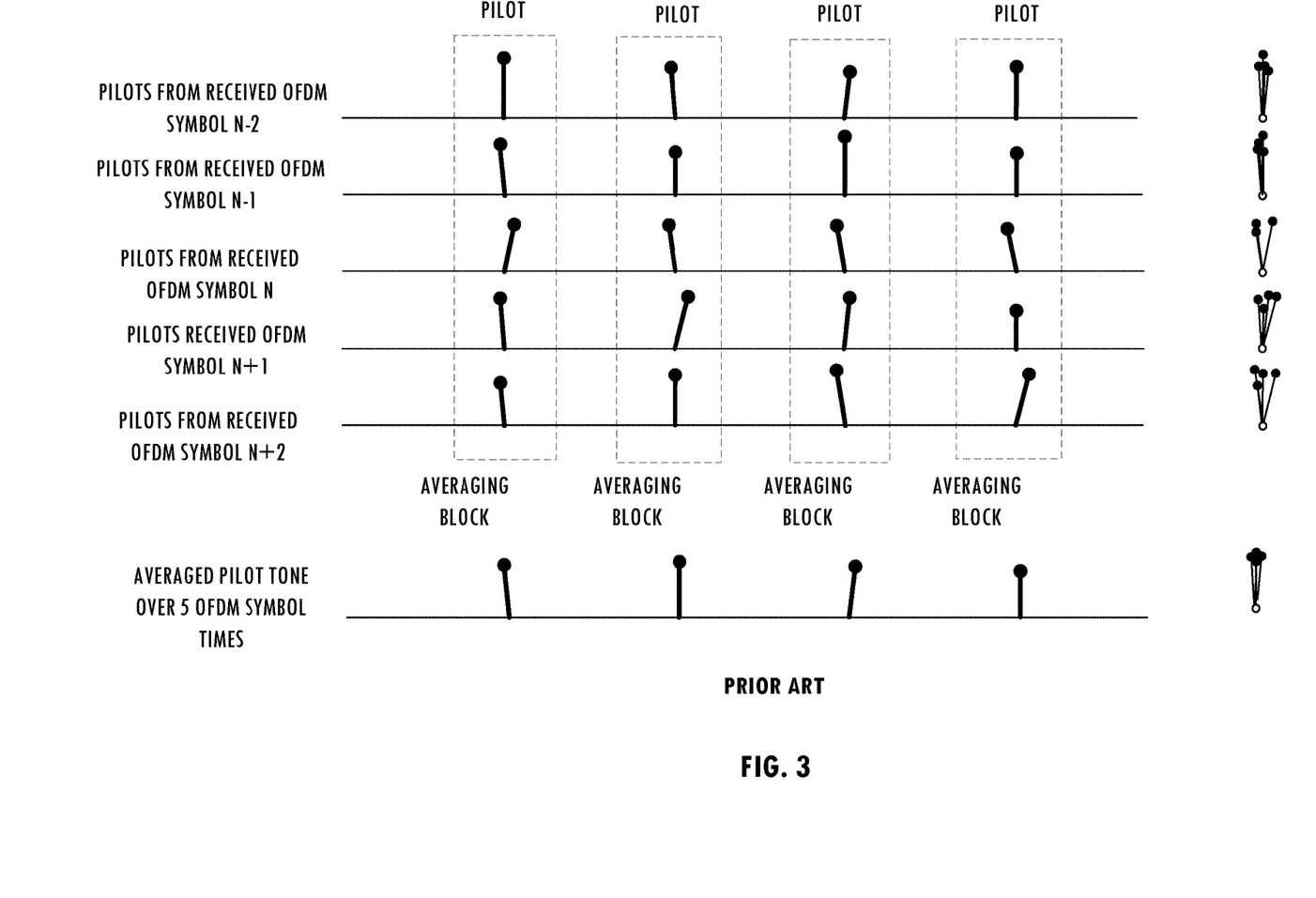
FIG. 3 illustrates a frequency domain representation of an exemplary channel estimation technique using time domain filtering of pilot tones.

Referring to FIG. 3, a technique for improving channel estimation by a receiver of an OFDM system includes low-pass filtering pilot tones in the time domain (e.g., five OFDM symbol times) to average the pilot tones from one OFDM symbol to the next, thereby reducing noise in the resulting, averaged pilot tone signal. In applications having a channel with substantially constant characteristics, the number of OFDM symbol times used by the average may be increased to further reduce the noise. However, in some applications (e.g., digital radio in a moving vehicle), the channel characteristics change rapidly and the averaging technique cannot track changes that occur faster than the averaging window. Thus, the amount of averaging that can be done in the time domain and the amount of noise that can be attenuated by this technique are limited. Accordingly, improved channel estimation techniques are desired.

SUMMARY OF EMBODIMENTS OF THE INVENTION

In at least one embodiment of the invention, a method includes generating a two-dimensionally filtered pilot tone based on a plurality of received pilot tones received using a first subcarrier of each of a plurality of received OFDM symbols and a plurality of data symbols received using a second subcarrier of each of the plurality of received OFDM symbols. The plurality of OFDM symbols is received sequentially over a plurality of OFDM symbol times. The method may include generating inverse channel coefficients based on the two-dimensionally filtered pilot tone. The method may include applying the inverse channel coefficients to a subsequently received OFDM symbol to recover data encoded in the subsequently received OFDM symbol. Generating the two-dimensionally filtered pilot tone may use at least one least-mean-squares filter.

In at least one embodiment of the invention, an OFDM receiver includes a two-dimensional pilot tone filter configured to generate a two-dimensionally filtered pilot tone based on a plurality of received pilot tones received using a first subcarrier of each of a plurality of received OFDM symbols and a plurality of data symbols received using a second subcarrier of each of the plurality of received OFDM symbols. The OFDM receiver includes an inverse channel generator configured to generate equalizer coefficients based on the two-dimensionally filtered pilot tone. The OFDM receiver may include a demodulator configured to generate the plurality of received OFDM symbols based on a digital time-domain OFDM symbol. The OFDM receiver may include an equalizer configured to generate a recovered OFDM symbol based on the equalizer coefficients and a received OFDM symbol. The two-dimensional pilot tone filter may include at least one least-means squares filter.

In at least one embodiment of the invention, a non-transitory, computer-readable storage medium stores instructions executable on a processor to cause the processor to generate a two-dimensionally filtered pilot tone based on a plurality of received pilot tones received using a first subcarrier of each of a plurality of received OFDM symbols and a plurality of data symbols received using a second subcarrier of each of the plurality of received OFDM symbols. The plurality of OFDM symbols are received sequentially over a plurality of received OFDM symbol times. Instructions executable on the processor may cause the processor to equalize a subsequently received OFDM symbol to recover data encoded in the subsequently received OFDM symbol, the equalizing using the two-dimensionally filtered pilot tone.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 4:
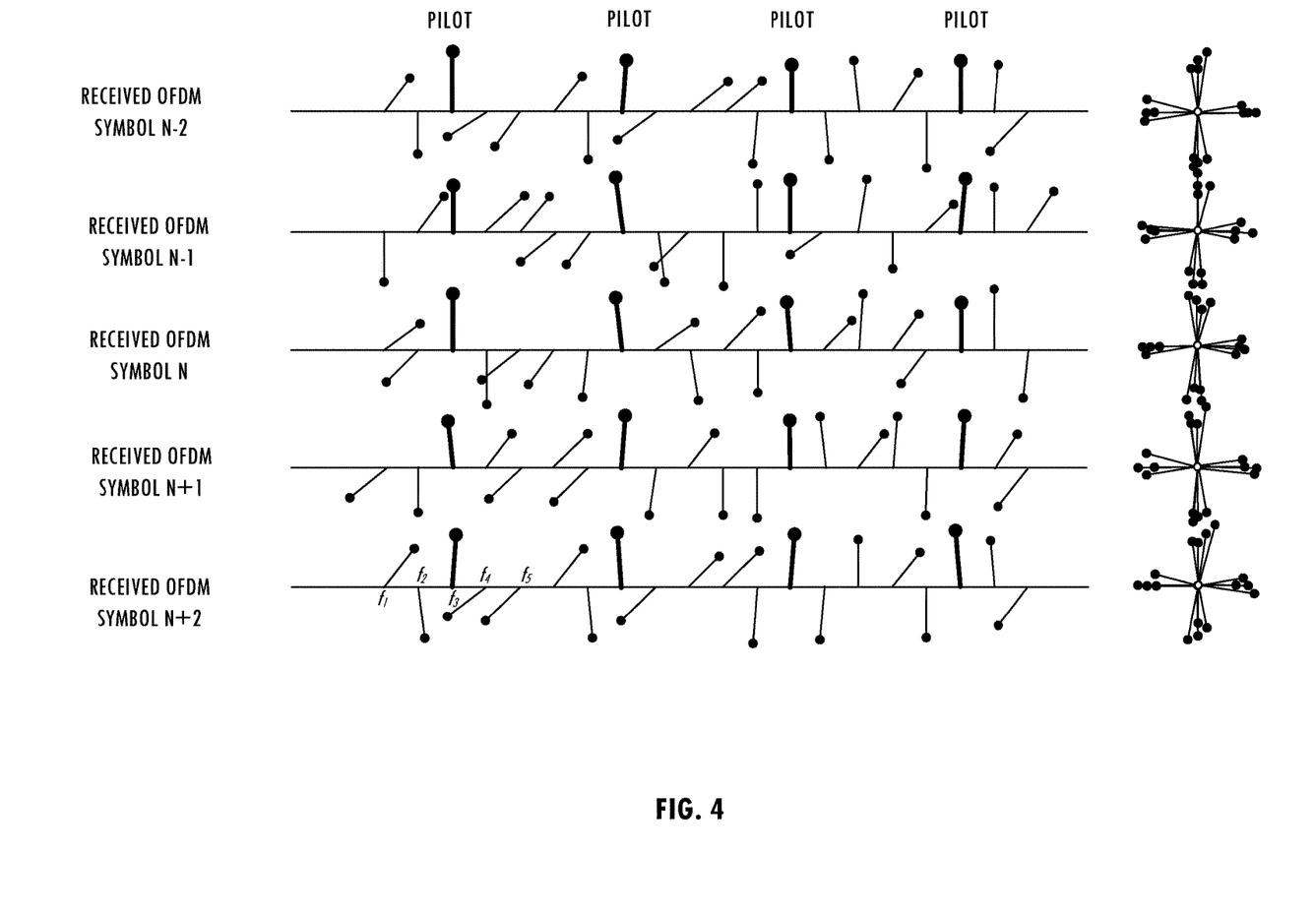
FIG. 4 illustrates a frequency domain representation of a plurality of received OFDM symbols used for generating a two-dimensionally filtered pilot tone for channel estimation consistent with at least one embodiment of the invention.
Figure 5:
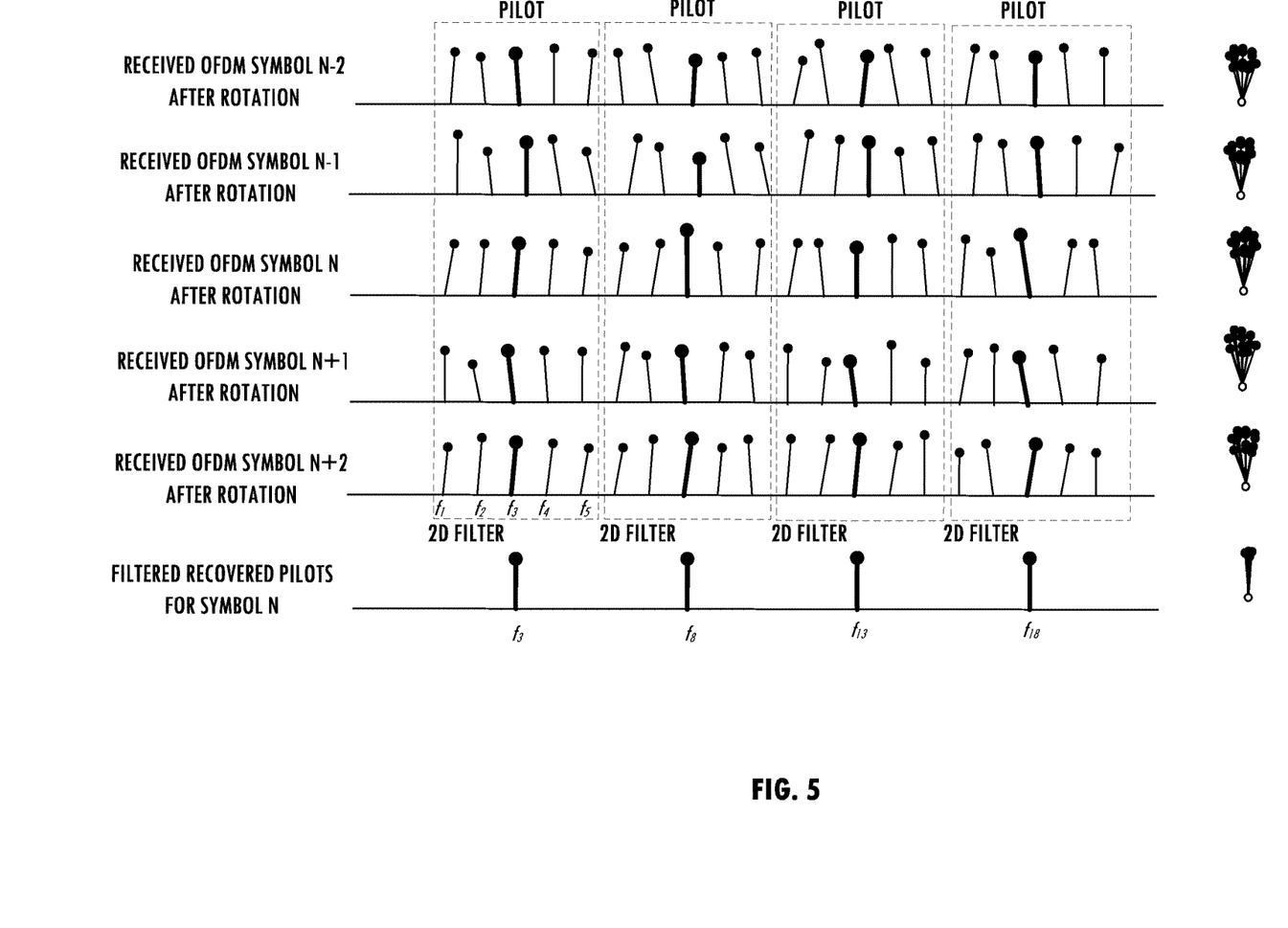
FIG. 5 illustrates a frequency domain representation of generating a two-dimensional filtering of pilot tones for channel estimation consistent with at least one embodiment of the invention.

An OFDM receiver estimates characteristics of a transmission medium (i.e., a channel) using a two-dimensional pilot tone recovery filter that filters pilot tones and data symbols of subcarriers proximate to the subcarriers of the pilot tones over multiple OFDM symbol times to improve channel estimation as compared to time domain filtering of the pilot tones. Referring to FIG. 4, an exemplary OFDM system receives five OFDM symbols with noise, each OFDM symbol including four pilot tones, over corresponding OFDM symbol times N−2, N−1, N, N+1, and N+2. The two-dimensional pilot tone recovery filter slices pilot tones and data symbols of the received OFDM symbol, i.e., implements maximum likelihood detection. For example, a quadrature phase shift keying (QPSK) slicer determines the axis of a two-dimensional complex plane that is closest to each received data symbol, and then rotates the data symbol by 0, 90, 180, or 270 degrees, accordingly, to make the data symbols closest to vertical on the two-dimensional complex plane. The rotated, received data symbols for the five OFDM symbols are illustrated in FIG. 5. Note that in other embodiments, the OFDM system implements other modulation schemes (e.g., 4-quadrature amplitude modulation (QAM), 16-QAM, 64-QAM, etc.) and a slicer implementing maximum likelihood detection consistent with the modulation scheme is used (e.g., a slicer that averages the complex difference between a received data symbol or pilot and a target data symbol or pilot and subtracting that average from the received data symbol or pilot). The two-dimensional pilot tone recovery filter then filters the output of the slicer in two dimensions, e.g., in frequency and in time, to recover one or more pilot tones. Noise introduced by the channel in those recovered pilot tones is attenuated by a greater amount than with time domain averaging described above.

Figure 6:
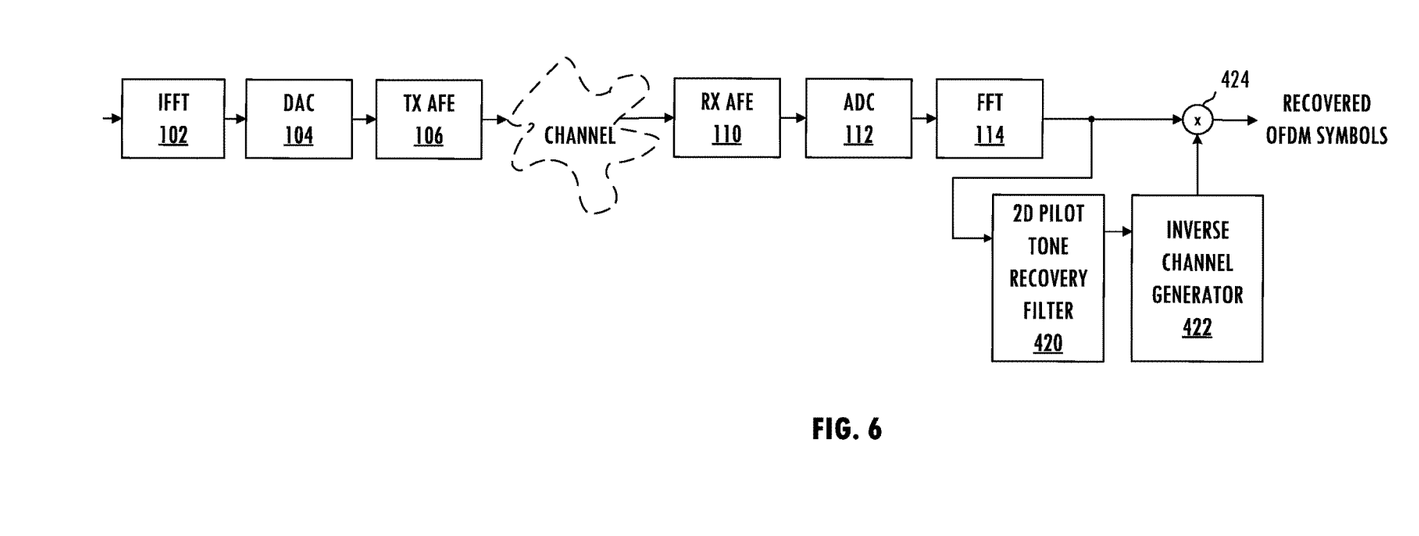
FIG. 6 illustrates a functional block diagram of an OFDM communications system implementing two-dimensional filtering of pilot tones and data symbols for OFDM channel estimation consistent with at least one embodiment of the invention

Referring to FIG. 6, an OFDM system includes inverse fast Fourier transform (IFFT) 102 modulates original complex data and provides time domain, digital data to digital-to-analog converter 104 for conversion into analog data for transmission as electromagnetic signals using channel 108. Transmitter analog front end 106 includes one or more of a low noise amplifier, another amplifier, a mixer, etc. for generating the electromagnetic signals. Receiver analog front end 110 includes one or more of automatic gain control, mixer, filters, etc. used to receive the electromagnetic signals using channel 108. Receiver analog front end 110 provides analog data to analog-to-digital converter 112, which provides digital, time domain data to fast Fourier transform (FFT) 114. Fast Fourier transform 114 demodulates the digital, time domain data by performing a discrete Fourier transform that converts the digital time domain data from a time domain representation to a frequency domain representation (i.e., a received OFDM symbol). Complex multiplier 116 multiplies the received OFDM symbol by digital inverse channel coefficients provided by inverse channel coefficients 118 to provide recovered complex data. Generation of inverse channel coefficients 118 based on an estimate of channel 108 is the subject of substantial effort during the design of an OFDM receiver.

Figure 7:
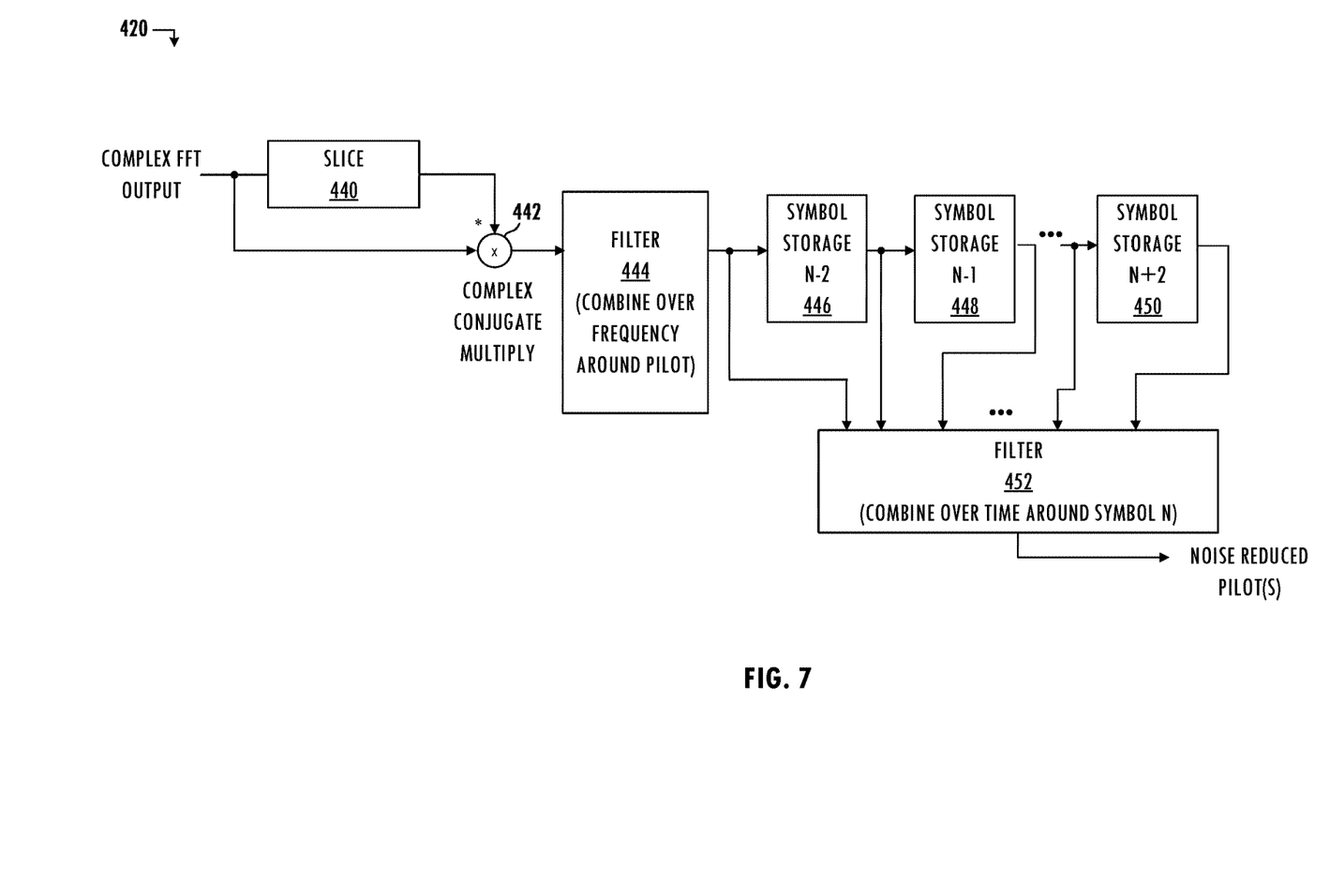
FIG. 7 illustrates a functional block diagram of a two-dimensional pilot tone recovery filter of the OFDM communications system of FIG. 6 consistent with at least one embodiment of the invention.

The OFDM system includes two-dimensional pilot tone recovery filter 420, inverse channel generator 422, and complex multiplier 424. The OFDM system may first use (e.g., during initialization) the unaltered pilot tones to generate initial inverse channel transfer function coefficients by conventional techniques. Referring to FIG. 7, two-dimensional pilot tone recovery filter 420 includes slicer 440, which receives demodulated data (e.g., complex FFT output). Slicer 440 selects, as an estimate of what was transmitted, the point on a constellation diagram that is closest (i.e., smallest Euclidian distance) to the received pilot tone or data symbol consistent with maximum likelihood detection for the particular modulation scheme. Complex multiplier 442 provides the product of the sliced value and the demodulated data. In an exemplary embodiment, two-dimensional pilot tone recovery filter 420 first filters pilot tones and data symbols with respect to frequency to reduce the amount of memory used for delaying values in time for the filtering with respect to time, as illustrated in FIG. 7.

Filter 444 combines the pilot tone at subcarrier $f_m$, where index m is an integer greater than zero (e.g., m=4) and corresponds to the number of transmitted pilot tones, with data symbols at subcarrier frequencies proximate to subcarrier $f_m$ (e.g., data symbols at subcarriers $f_{m-1}$, $f_{m-2}$, $f_{m+1}$, $f_{m+2}$) of an OFDM symbol output of slicer 440 of received OFDM symbol n. Filter 444 provides a frequency-combined pilot tone associated with subcarrier $f_{m-2}$ to a delay line of at least one storage element (e.g., symbol storage 446, symbol storage 448, and symbol storage 450) configured to store frequency-combined pilot tones associated with received OFDM symbols of sequential OFDM symbol times.

Filter 452 combines the frequency-combined pilot tone associated with subcarrier $f_m$ of received OFDM symbol n with frequency-combined pilot tones associated with subcarrier f of other OFDM symbol times (e.g., those stored in symbol storage 446, symbol storage 448, and symbol storage 450), and updates symbol storage 446, symbol storage 448, and symbol storage 450, e.g., by shifting the frequency-combined pilot tone of the next sequential OFDM symbol into the delay line. As a result, filter 452 provides a two-dimensionally filtered pilot tone, which has less noise than a corresponding pilot tone provided by prior art techniques described above.

Rather than first filtering with respect to frequency before filtering with respect to time, in other embodiments, two-dimensional pilot tone recovery filter 420 first filters with respect to time before filtering with respect to frequency. Additional symbol storage elements store a pilot tone filtered by a first filter of two-dimensional pilot tone recovery filter 420 with respect to time and data symbols in subcarriers proximate to subcarrier of the pilot tone filtered with respect to N OFDM symbol times. Then, a second filter of two-dimensional pilot tone recovery filter 420 filters the stored pilot tone and stored subcarriers proximate to the subcarrier of the stored pilot tone with respect to frequency. The resulting two-dimensionally filtered pilot tone has less noise than a pilot tone provided by prior art techniques described above.

Note that the number of OFDM symbol times and the number of data symbols in subcarriers proximate to the subcarrier of the pilot tone used may vary according to the application. In an exemplary application (e.g., digital radio system), two-dimensional pilot tone recovery filter 420 uses five received OFDM symbols, four subcarriers on each side of a particular pilot tone, and five pilot tones, thus using 45 pilot tones and data symbols, resulting in a 16 dB attenuation of noise, which is 9 dB improvement over a prior art embodiment using only five pilot tones averaged over time. In addition, two-dimensional pilot tone recovery filter 420 responds quickly to varying channel conditions as compared to time averaging techniques that achieve comparable noise attenuation specifications.

In at least one embodiment, at least one of filter 444 and filter 452 implements an averaging filter (e.g., filter 444 averaging the pilot tone with data symbols in proximate subcarriers resulting in an average with respect to frequency and filter 452 averaging the frequency-averaged pilot tones over multiple OFDM symbol times resulting in an average with respect to time). However, in other embodiments, filter 444 and filter 452 use other filtering functions. For example, at least one of filter 444 and filter 452 implements an adaptive filtering function (e.g., least-mean-squares filtering). Other filtering functions weight the filter coefficients of data symbols or averaged data symbols based on a distance of the associated subcarrier frequency from the pilot tone subcarrier frequency. Instead of averaging, a triangle filtering function applied to the filter coefficients of data symbols, where a contribution of a particular data symbol to the filter output is proportional to the inverse of distance of the associated subcarrier frequency from an adjacent pilot tone subcarrier frequency. For example, filter 444 includes a central pilot tone ($f_m$) and four side tones ($f_{m-2}$, $f_{m-1}$, $f_{m+1}$, and $f_{m+2}$), ⅓ of the central pilot tone ($f_m$) is added to ⅖ of each of the data symbols of the two adjacent subcarrier frequencies ($f_{m-1}$ and $f_{m+1}$), and ⅑ of each of the data symbols of the next two adjacent subcarrier frequencies ($f_{m-2}$ and $f_{m+2}$). Other windowing functions may be implemented (e.g., Hamming, Blackman) by filter 452 or filter 444.

Referring back to FIG. 6, two-dimensional pilot tone recovery filter 420 provides the one or more two-dimensionally filtered pilot tones to inverse channel generator 422, which generates complex coefficients for an inverse channel transfer function based on the two-dimensionally filtered pilot tones. An exemplary technique for generating the inverse channel of a channel with frequency response C(f) includes linearly interpolating between filtered pilot tones, generating the complex conjugate of each resulting complex coefficient, and dividing each resulting complex coefficient by its length. For example, where $C(f_m)$ corresponds to a filtered pilot tone and $C(f_{m+5})$ corresponds to a next filtered pilot tone, then the complex coefficient for the subcarrier frequency $f_{m+1}$ is $C(f_{m+1})=(⅘ \times C(f_m))+(⅕ \times C(f_{m+5}))$. Similarly, $C(f_{m+2})=(⅗ \times C(f_m))+(⅖ \times C(f_{m+5}))$. The inverse channel I(f) is constructed by computing the complex conjugate of each of the complex coefficients $C(f_n)$ and dividing each of the complex conjugates by the square of the length of the corresponding $C(f_n)$. Complex multiplier 424 applies the inverse channel transfer function coefficients to received OFDM symbols and provides the product as the recovered OFDM symbols.

Figure 8:
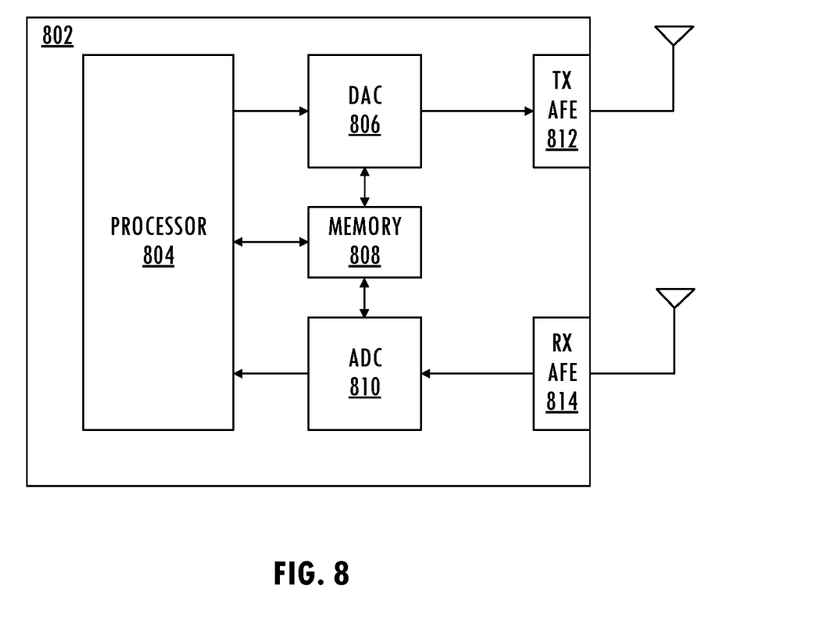
FIG. 8 illustrates a processing system configured to implement the two-dimensional pilot tone recovery filtering technique of the OFDM communications system of FIG. 6 consistent with at least one embodiment of the invention.

Structures described herein may be implemented using software executing on a processor (which includes firmware) or by a combination of software and hardware. Software, as described herein, may be encoded in at least one tangible (i.e., non-transitory) computer-readable medium. As referred to herein, a tangible computer-readable medium includes at least a disk, tape, or other magnetic, optical, or electronic storage medium (e.g., random access memory, read-only-memory). For example, FIG. 8 illustrates receiver 802, which includes transmitter analog front end 812 and receiver analog front end 814, each coupled to a respective antenna. Processor 804, which may be a digital signal processor or other processing circuit, implements complex data processing including data coding and modulation (e.g., IFFT) by executing instructions fetched from memory 808. Custom hardware circuits implement digital-to-analog converter 806, which provides analog data to transmitter analog front end 812 for transmission as electromagnetic signals over the air. Receiver analog front end 814 receives electromagnetic signals over the air and provides the analog signal to custom hardware circuit implementation of analog-to-digital converter 810, which provides digital data to processor 804. Processor 804 implements complex data processing including demodulation (e.g., FFT) and data decoding by executing instructions fetched from memory 808.

Thus, two-dimensional filtering of pilot tones that provides a fast response to changing channel conditions and high attenuation of noise has been described. The description of the invention set forth herein is illustrative, and is not intended to limit the scope of the invention as set forth in the following claims. For example, while the invention has been described in an embodiment for a digital radio application, one of skill in the art will appreciate that the teachings herein can be utilized in other OFDM communications applications. Variations and modifications of the embodiments disclosed herein, may be made based on the description set forth herein, without departing from the scope of the invention as set forth in the following claims.

What is claimed is:

1. A method comprising:
generating a two-dimensionally filtered pilot tone based on a plurality of received pilot tones received using a first subcarrier of each of a plurality of received orthogonal frequency division multiplexing (OFDM) symbols and a plurality of data symbols received using a second subcarrier of each of the plurality of received OFDM symbols, the plurality of received OFDM symbols being received sequentially over a plurality of OFDM symbol times,
wherein the generating comprises:
filtering with respect to a first dimension, signals based on the plurality of received OFDM symbols to generate a first filtered signal; and
filtering with respect to a second dimension, signals based on the first filtered signal to generate the two-dimensionally filtered pilot tone,
wherein the first dimension and the second dimension are frequency and time, respectively, or the first dimension and the second dimension are time and frequency, respectively.

2. The method, as recited in claim 1, further comprising:
receiving a first received OFDM symbol of the plurality of received OFDM symbols, the first received OFDM symbol comprising a first received pilot tone of the plurality of received pilot tones at a first frequency of the first subcarrier and a first received data symbol at a second frequency of the second subcarrier.

3. The method, as recited in claim 2, further comprising:
slicing and rotating the first received data symbol using a nearest constellation point to generate a first data symbol of the plurality of data symbols.

4. The method, as recited in claim 3, wherein the first dimension is frequency and the second dimension is time and the filtering with respect to the first dimension comprises:
filtering the first received pilot tone and the first data symbol to generate a first filtered pilot tone corresponding to the first received OFDM symbol.

5. The method, as recited in claim 4, wherein the filtering with respect to the second dimension comprises:
filtering the first filtered pilot tone and a second filtered pilot tone corresponding to a second received OFDM symbol of the plurality of received OFDM symbols to generate the two-dimensionally filtered pilot tone.

6. The method, as recited in claim 2, wherein the first received OFDM symbol comprises a plurality of first received pilot tones received using a plurality of subcarriers, the plurality of first received pilot tones including the first received pilot tone, the plurality of subcarriers being spaced across the first received OFDM symbol.

7. The method, as recited in claim 1, further comprising:
generating inverse channel coefficients based on the two-dimensionally filtered pilot tone; and
applying the inverse channel coefficients to a subsequently received OFDM symbol of the plurality of received OFDM symbols to recover data encoded in the subsequently received OFDM symbol.

8. The method, as recited in claim 1,
wherein the first dimension is frequency and the second dimension is time,
wherein the filtering with respect to the first dimension comprises averaging each of the plurality of received pilot tones with a corresponding data symbol of the plurality of data symbols to generate a plurality of first averaged pilot tones corresponding to each of the plurality of received OFDM symbols, and
wherein the filtering with respect to the second dimension comprises averaging the plurality of first averaged pilot tones to generate the two-dimensionally filtered pilot tone.

9. The method, as recited in claim 1,
wherein the first dimension is frequency and the second dimension is time,
wherein the filtering with respect to the first dimension comprises adaptive filtering each of the plurality of received pilot tones with a corresponding data symbol of the plurality of data symbols to generate a plurality of first filtered pilot tones corresponding to each of the plurality of received OFDM symbols, and
wherein the filtering with respect to the second dimension comprises adaptive filtering the plurality of first filtered pilot tones to generate the two-dimensionally filtered pilot tone.

10. The method, as recited in claim 1, wherein the generating uses at least one least-mean-squares filter.

11. An orthogonal frequency division multiplexing (OFDM) receiver comprising:
a two-dimensional pilot tone filter configured to generate a two-dimensionally filtered pilot tone based on a plurality of received pilot tones received using a first subcarrier of each of a plurality of received OFDM symbols and a plurality of data symbols received using a second subcarrier of each of the plurality of received OFDM symbols, the two-dimensional pilot tone filter comprising:
a first filter configured to filter with respect to a first dimension, signals based on the plurality of received OFDM symbols to generate a first filtered signal; and
a second filter configured to filter with respect to a second dimension, signals based on the first filtered signal to generate the two-dimensionally filtered pilot tone, the first dimension and the second dimension being frequency and time, respectively, or the first dimension and the second dimension being time and frequency, respectively; and
an inverse channel generator configured to generate equalizer coefficients based on the two-dimensionally filtered pilot tone.

12. The OFDM receiver, as recited in claim 11, further comprising:
a demodulator configured to generate the plurality of received OFDM symbols based on a digital time-domain OFDM symbol; and
an equalizer configured to generate a recovered OFDM symbol based on the equalizer coefficients and a received OFDM symbol of the plurality of received OFDM symbols.

13. The OFDM receiver, as recited in claim 12, further comprising:
a digital signal processor; and
software stored in a storage element coupled to the digital signal processor, the software being executable by the digital signal processor to implement one or more of the demodulator, the two-dimensional pilot tone filter, the inverse channel generator, and the equalizer.

14. The OFDM receiver, as recited in claim 11, wherein the two-dimensional pilot tone filter comprises:

a slicer configured to generate an estimated data symbol using a nearest constellation point; and a complex multiplier configured to rotate the estimated data symbol to generate a first data symbol of the plurality of data symbols.

15. The OFDM receiver, as recited in claim 14, wherein the first filter is configured to filter the first data symbol and a first pilot tone to generate a filtered pilot tone, and wherein the two-dimensional pilot tone filter further comprises:

a storage element configured to store a second filtered pilot tone corresponding to a second received OFDM symbol of the plurality of received OFDM symbols, wherein the second filter is configured to filter the filtered pilot tone with the second filtered pilot tone to generate the two-dimensionally filtered pilot tone.

16. The OFDM receiver, as recited in claim 11, wherein the first filter or the second filter comprises an averaging filter.

17. The OFDM receiver, as recited in claim 11, wherein the first filter or the second filter comprises a least-means squares filter.

18. The OFDM receiver, as recited in claim 11, wherein the two-dimensional pilot tone filter comprises:

a storage element configured to store a first pilot tone of the plurality of received pilot tones corresponding to a first received OFDM symbol of the plurality of received OFDM symbols, wherein the first filter is configured to filter the first pilot tone with a second pilot tone corresponding to a second received OFDM symbol of the plurality of received OFDM symbols to generate a time-filtered pilot tone, and wherein the second filter is configured to filter the time-filtered pilot tone with a time-filtered data symbol to generate the two-dimensionally filtered pilot tone.

19. A method comprising:

generating a two-dimensionally filtered pilot tone based on a plurality of received pilot tones received using a first subcarrier of each of a plurality of received orthogonal frequency division multiplexing (OFDM) symbols and a plurality of data symbols received using a second subcarrier of each of the plurality of received OFDM symbols, the plurality of received OFDM symbols being received sequentially over a plurality of OFDM symbol times, wherein the generating comprises:

filtering each of the plurality of received pilot tones with a corresponding data symbol of the plurality of data symbols to generate a plurality of first filtered pilot tones corresponding to each of the plurality of received OFDM symbols; and filtering the plurality of first filtered pilot tones to generate the two-dimensionally filtered pilot tone.

20. The method, as recited in claim 19, wherein the generating uses at least one adaptive filter.

* * * * *